United States Patent
Beighe et al.

[11] Patent Number: 5,912,896
[45] Date of Patent: Jun. 15, 1999

[54] CABLE MODEM INTERFACE UNIT FOR GENERATING AND TRANSMITTING REPLY CONTROL PACKETS

[75] Inventors: Edward W. Beighe, Phoenix; Mannan Abdul Mohammed, Chandler, both of Ariz.

[73] Assignee: Intel Corporation, Santa Clara, Calif.

[21] Appl. No.: 08/764,929

[22] Filed: Dec. 13, 1996

[51] Int. Cl.⁶ .................................................. H04L 12/28
[52] U.S. Cl. ...................... 370/463; 370/469; 395/200.8
[58] Field of Search ..................... 370/465, 469, 370/463, 401, 419; 395/200.5, 200.52, 200.67, 200.8, 200.83, 200.57; 375/222

[56] References Cited

U.S. PATENT DOCUMENTS

| | | | |
|---|---|---|---|
| 5,448,566 | 9/1995 | Richter et al. | 370/469 |
| 5,727,159 | 3/1998 | Kikinis | 395/200.76 |
| 5,742,607 | 4/1998 | Beighe et al. | 370/419 |

*Primary Examiner*—Chi H. Pham
*Assistant Examiner*—Ricky Q. Ngo
*Attorney, Agent, or Firm*—Kenyon & Kenyon

[57] ABSTRACT

A cable modem interface unit transmits packets to a packet source. The packet source sends control packets to a cable modem and requires a reply control packet in response to sending a control packet. The cable modem interface unit is coupled to the cable modem and a network driver interface layer. The interface unit generates a reply control packet in response to receiving a control packet from the cable modem. The reply control packet is queued in a transmit stack in the interface unit. The transmit stack includes data packets received from the network driver interface layer. The interface unit sends the reply control packet and the data packets from the stack to the cable modem so that they are eventually sent to the packet source.

18 Claims, 3 Drawing Sheets

CABLE MODEM INTERFACE UNIT FOR GENERATING AND TRANSMITTING REPLY CONTROL PACKETS

FIELD OF THE INVENTION

The present invention is directed to a cable modem interface unit for generating and transmitting reply control packets. More particularly, the present invention is directed to a cable modem interface unit positioned between a cable modem and a network driver interface layer for generating and transmitting reply control packets, and transmitting data packets from the network driver interface layer.

BACKGROUND OF THE INVENTION

With the recent rise in popularity of the Internet, many home computer users are using a modem to access the Internet though the Public Switched Telephone Network ("PSTN") using home telephone lines. The PSTN provides a dedicated circuit from the modem to a server located at an Internet service provider. The server functions as a gateway to the Internet. However, the bandwidth of typical home telephone lines is relatively small, which limits the speed that information can be received from the Internet.

As an alternative to using telephone lines, the Internet can be accessed through coaxial cables using a cable modem. Coaxial cables provides much greater bandwidth than home telephone lines and are widely available to existing cable television subscribers.

Unlike telephone lines, existing coaxial cable infrastructure typically does not provide a dedicated circuit to the home user. Instead, multiple users are usually coupled to the same coaxial cable leading to a server located at an Internet service provider. In addition, television signals are also frequently sent on the same coaxial cable. Therefore, Internet service providers that use coaxial cables must send and receive both data packets that contain Internet data, and control packets.

The control packets provide the computer and the cable modem with information needed to send and receive the data packets, such as what frequency packets flowing out of the cable modem should be transmitted on, what should its transmitter power level be, how many packets may be transmitted, what data packets on the coaxial cable are intended for the cable modem, etc. When an Internet service provider sends a control packet to a computer, the Internet service provider must receive a reply control packet from the computer as part of a handshaking routine between the Internet service provider and the computer. The reply control packet tells the Internet service provider that the computer received and processed the control packet.

Known cable modems typically have associated with them specialized processors, memory, and software for generating and transmitting reply control packets. This specialized computer hardware and software is in addition to the hardware and software within the computer, and therefore increases the costs of equipping a home computer so that it can utilize coaxial cable for Internet access.

Based on the foregoing, there is a need for a mechanism that uses computer software and hardware that is already found on a typical home computer, or that is widely available, to generate reply control packets and to transmit the reply control packets to an Internet service provider.

SUMMARY OF THE INVENTION

These and other needs are satisfied by the present invention. An embodiment of the present invention is a cable modem interface unit for transmitting packets to a packet source. The packet source sends control packets to a cable modem and requires a reply control packet in response to sending a control packet. The cable modem interface unit is coupled to the cable modem and a network driver interface layer. The interface unit generates a reply control packet in response to receiving a control packet from the cable modem. The reply control packet is queued in a transmit stack in the interface unit. The transmit stack includes data packets received from the network driver interface layer. The interface unit sends the reply control packet and the data packets from the stack to the cable modem so that they are eventually sent to the packet source.

DETAILED DESCRIPTION

The present invention is related to the invention disclosed in U.S. application Ser. No. 08/764,931, filed Dec. 13, 1996 entitled "Cable Modem Interface Unit for Capturing and Processing Incoming Packets Received from a Cable Modem" by E. W. Beighe and M. A. Mohammed, filed concurrently herewith, the disclosure of which is hereby incorporated by reference.

The invention will be described in connection with an exemplary computer system that includes a cable modem and a network driver interface layer. The cable modem interface unit of the present invention is computer software or hardware that interfaces with the cable modem and the network driver interface layer.

Figure 1:
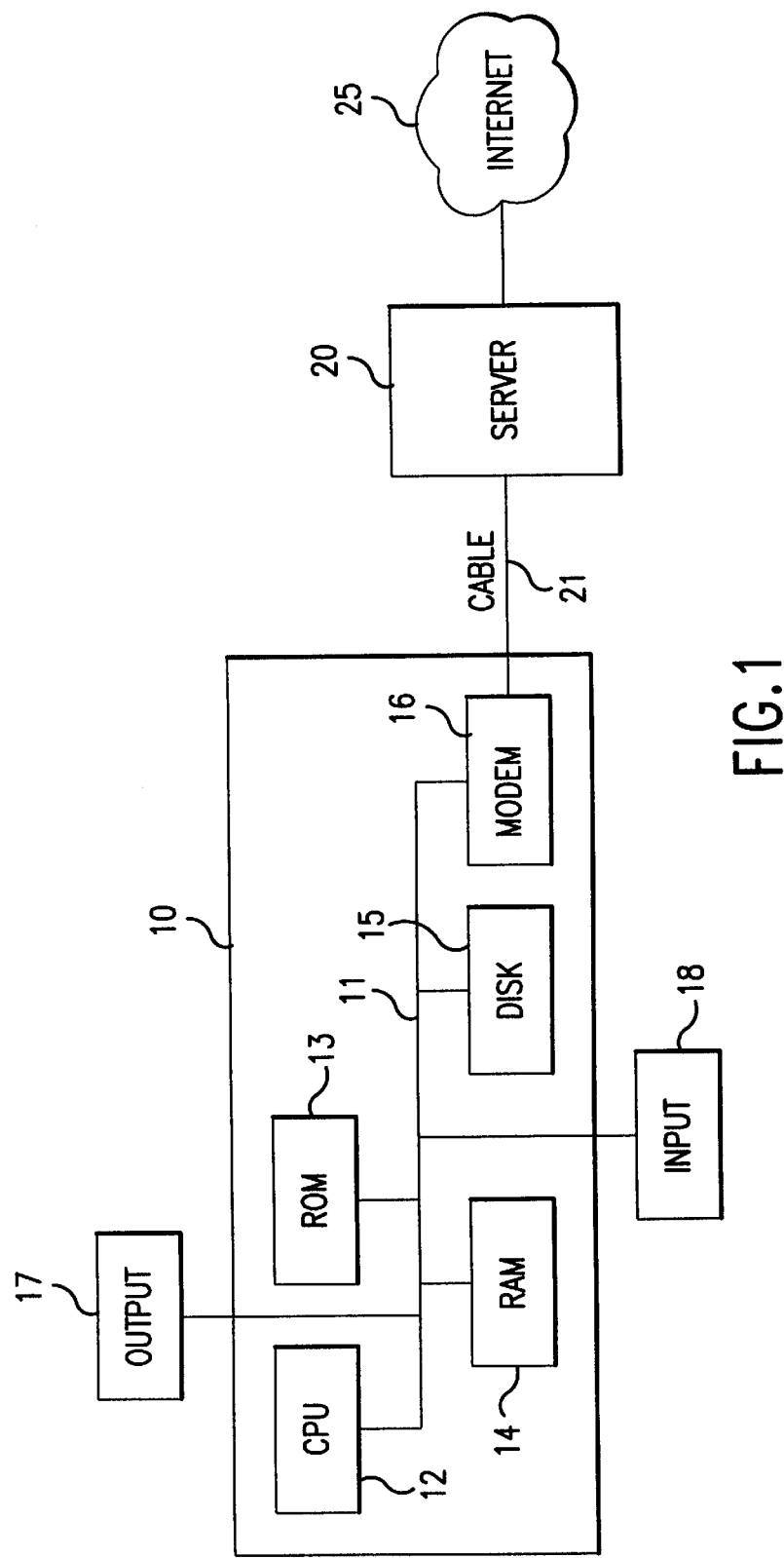
FIG. 1 is a block diagram of an embodiment of the present invention coupled to an Internet service provider through a coaxial cable.

Referring now in detail to the drawings, wherein like parts are designated by like reference numerals throughout, there is illustrated in FIG. 1 a block diagram of an embodiment of the present invention coupled to an Internet service provider through a coaxial cable.

In FIG. 1, a general purpose computer 10 is coupled through a coaxial cable 21 to a server 20 located at an Internet service provider. Server 20 is in turn coupled to the Internet 25. Server 20 acts a point of presence ("POP") and provides high-speed data services. The computer 10, also referred to as a client, includes a bus 11. All components coupled to bus 11 communicate with each other in a known way.

Coupled to bus 11 is a processor ("CPU") 12, a random access memory (RAM) 14, a disk drive 15, and a read only memory ("ROM") 13. In one embodiment, CPU 12 is a Pentium® or Pentium® Pro microprocessor from Intel Corporation. Further coupled to bus 11 is an output device 17, e.g, a monitor, and an input device 18, e.g, a keyboard or mouse. A cable modem 16 is also coupled to bus 11 and to coaxial cable 21.

RAM 14, ROM 13 and disk drive 15 have various software elements stored in them that cooperate with CPU 12 to provide desired results. These software elements, not shown in FIG. 1, include an operating system. In one embodiment, the operating system includes a transport stack layer. The transport stack layer includes a Transmission Control Protocol/Internet Protocol ("TCP/IP") layer and a network driver interface layer. In other embodiments, these layers can be added onto the operating system. Layers are logical divisions in a computer system among its hardware and software functional components.

The TCP/IP layer, also referred to as a transport layer, enables the computer 10 to receive and send data on a TCP/IP network, such as the Internet. The TCP/IP layer surrounds data passed from upper layers in the computer 10 with header information required by the TCP/IP. Likewise, the TCP/IP layer strips TCP/IP header information from TCP/IP data before sending the data to upper layers.

The network driver interface layer provides communication between the transport layer and a network driver (also referred to as a device driver). Examples of network driver interface layers include the Open Data-Link Interface ("ODI") layer from Novell, Inc. and the Network Driver Interface Specification ("NDIS") layer from Microsoft Corp.

In one embodiment, the operating system is Windows® 95 or Windows® NT from Microsoft Corporation. Both of these operating systems include a transport stack which includes a TCP/IP layer and an NDIS layer. Further information about the NDIS layer is disclosed, for example, in a CD-ROM from Microsoft Corporation entitled *Microsoft Developer's Network Library* (1996), incorporated herein by reference, and in Dhawan, Sanjay, *Networking Device Drivers*, ch. 5, pp. 197–231, Van Nostrand Reinhold (1995), also incorporated herein by reference.

Device drivers that interface with an NDIS layer are referred to as "miniport" drivers. Miniport drivers are positioned between the NDIS layer and a network controller.

Other software elements stored within computer 10 include application programs and, in one embodiment of the present invention, interface software that includes routines that perform the function of a cable modem interface unit. The interface software, when used with an NDIS layer, is implemented as a miniport driver.

Figure 2:
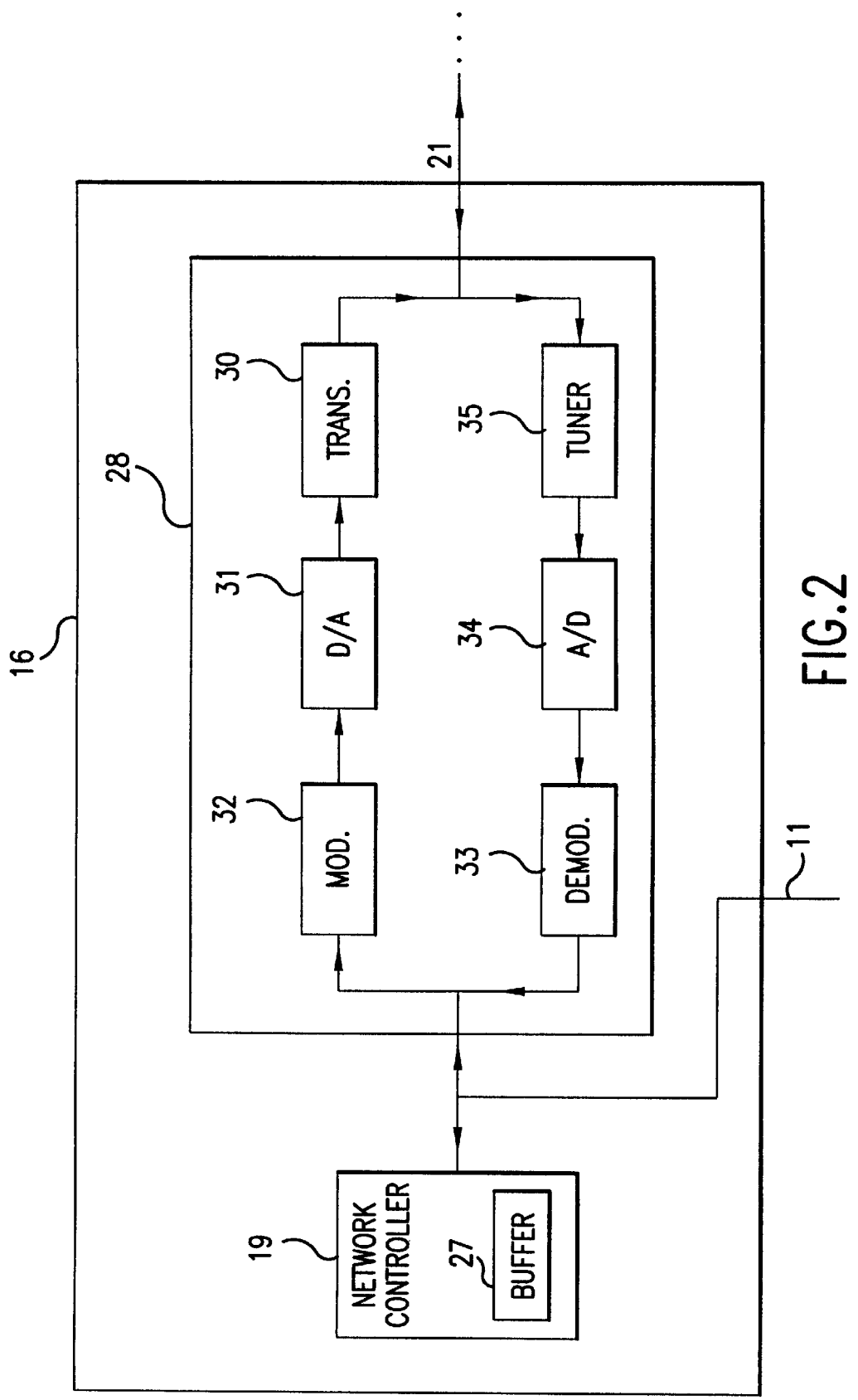
FIG. 2 is a block diagram illustrating details of a cable modem.

FIG. 2 is a block diagram illustrating in more detail cable modem 16. Cable modem 16 includes a network controller 19 and a Radio/Frequency ("R/F") module 28. A network controller formats digital packets so they are compatible with the network medium that corresponds with the network controller. A network controller can be implemented as part of a network interface card. In one embodiment, network controller 19 is an Ethernet controller. An Ethernet network is a computer network that falls under the IEEE 802-3 standard. Ethernet controllers are widely available from many manufacturers. For example, in one embodiment network controller 19 is the 82557 Ethernet controller from Intel Corporation. Network controller 19 includes a buffer 27 for storing incoming packets from coaxial cable 21.

In additional embodiments of the present invention, network controllers other than Ethernet controllers, e.g., Token Ring controllers, ARCNET controllers, asynchronous transfer mode ("ATM") controllers, etc. can be used as network controller 19.

R/F module 28 performs the necessary functions for receiving and transmitting analog data on the coaxial cable 21 so that it is usable by network controller 19. On the transmit side, R/F module 16 receives data from network controller 19. The data is modulated by modulator 32, converted from digital to analog by a digital-to-analog ("D/A") converter 31 and transmitted onto coaxial cable 21 by a transmitter 30. The carrier frequency used by transmitter 30 to transmit data is specified by control packets received by CPU 12 from server 20 in FIG. 1.

On the receive side of R/F module 28 in FIG. 2, incoming data on coaxial cable 21 is received by a tuner 35. Tuner 35 is tuned to a particular frequency that is specified by control packets received by CPU 12 from server 20 in FIG. 1. The received data is converted from analog to digital by an analog-to-digital ("A/D") converter 34. The data is then demodulated by a demodulator 33 and passed to network controller 19 and placed on the bus 11.

Figure 3:
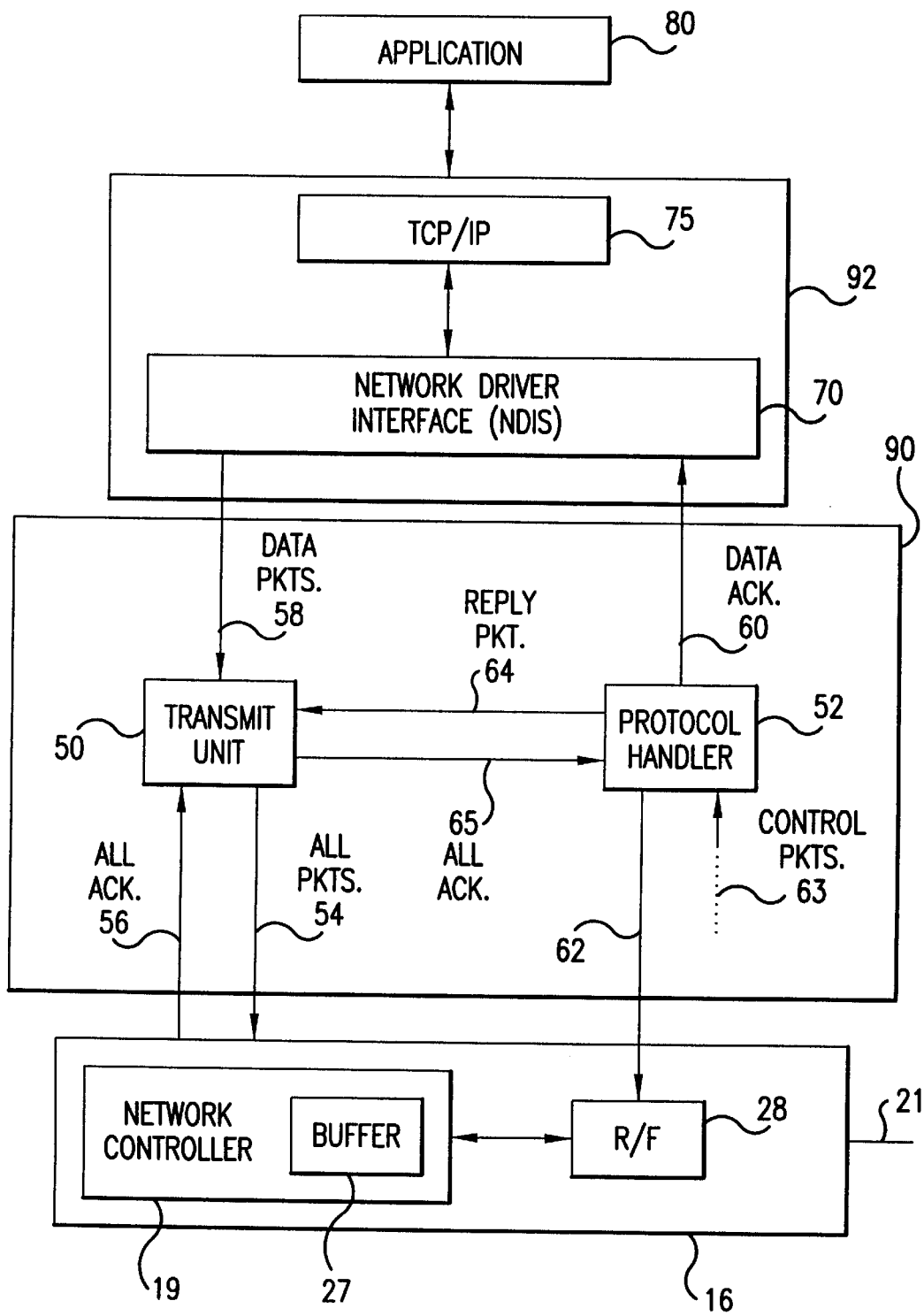
FIG. 3 is a block diagram of the functions performed by an embodiment of the present invention.

FIG. 3 is a block diagram of some of the layered functions performed by computer 10. When the functions in FIG. 3 are implemented with software, the software is stored in memory (which comprises a combination of RAM 14, ROM 13 and disk drive 15) and is executed by CPU 12.

An application 80 layer includes the application programs run by computer 10. An example of an application program is an Internet Web browser that is used to view data received from the Internet and initiate requests of data from the Internet.

A transport stack layer 92 is coupled to application layer 80. Transport stack layer 92 includes a TCP/IP layer 75 and a network driver interface layer 70. TCP/IP layer 75 performs the functions required when communicating with a TCP/IP network such as the Internet. In one embodiment of the present invention, when Windows® 95 or Windows® NT are used as the operating system of computer 10, TCP/IP layer 75 and network driver interface layer 70 are included with the operating system. In this embodiment, network driver interface layer 70 is an NDIS layer.

A cable modem interface unit 90 layer is coupled to the network driver interface layer 70. The interface unit 90 includes a transmit unit 50 and a protocol handler 52. The interface unit 90 is also coupled to cable modem 16 through bus 11 (bus 11 is not shown in FIG. 3).

Data that is to be transmitted to the Internet service provider is generated by application layer 80 or by the operating system of computer 10. The data is sent to TCP/IP 75 where it is packetized. The data packets are then sent to network driver interface layer 70 where they are queued on a stack in network driver interface layer 70. In prior art computer systems without cable modem interface unit 90, the data packets would then be sent directly from network driver interface layer 70 to network controller 19. However, in computer 10 of the present invention, the data packets are instead sent to transmit unit 50 via path 58 where they are queued on a stack in transmit unit 50. Network driver interface layer 70 stores a copy of each data packet sent until it receives an acknowledgment that the data packet was received by network controller 19.

Protocol handler 52 receives control packets on path 63 that originate from the Internet service provider. In response to receiving control packets, protocol handler 52 processes control packets via path 62. U.S. application Ser. No. 08/764,931, filed Dec. 13, 1996 discloses additional details on how protocol handler 52 receives control packets and how protocol handler 52 processes packets.

In addition to processing control packets, protocol handler 52 generates a reply control packet in response to receiving a control packet. A reply control packet must be transmitted to the Internet service provider when a control packet is received for handshaking purposes. In order to generate the reply control packet, protocol handler 52 first creates a reply control packet header by retrieving the source and destination address from the received control packet. The source address of the control packet is used as the destination address of the reply control packet. The destination address of the reply control packet header is generated from the hardware address of cable modem 16, (e.g., the media access control ("MAC") address if cable modem 16 includes an Ethernet network controller), and the Internet Protocol ("IP") address of cable modem 16. The reply control packet header is added to the body of the reply control packet. The body of the reply control packet is defined by the Internet service provider. Other fields such as a Cyclical Redundancy Check ("CRC") are also computed by protocol handler 52 and added to the reply control packet.

The generated reply control packet is sent to transmit unit 50 via path 64 where it is merged with the data packets in the transmit unit 50 stack. Protocol handler 52 stores a copy of each reply control packet sent until it receives an acknowledgment that the reply control packet was received by network controller 19.

Transmit unit 50 sends packets from its stack to network controller 19 via path 54, which in turn sends the packets to the Internet service provider via coaxial cable 21. Network controller 19 sends acknowledgments for each packet received to transmit unit 50 via path 56. Acknowledgments are sent for both data packets and reply control packets. Network driver interface layer 70 expects acknowledgments for each data packet sent to transport unit 50 but has no use for reply control packet acknowledgments. Therefore, all of the acknowledgments are forwarded by transmit unit 50 to protocol handler 52 via path 65. Protocol handler 52 intercepts all reply control packet acknowledgments and erases the copy of the reply control packet corresponding to each received reply control packet acknowledgment. Protocol handler 52 then sends all the data packet acknowledgments to network driver interface layer 70 via path 60. Network driver interface layer 70 erases the copy of the data packet corresponding to each received data packet acknowledgment.

As described, cable modem interface unit 90 generates reply control packets and sends them to the Internet service provider along with data packets sent from network driver interface layer 70. Further, cable modem interface unit 90 intercepts acknowledgments from network controller 19, and sends to network driver interface layer 70 only the acknowledgments that network driver interface layer 70 expects to receive.

In addition, cable modem interface unit 90 utilizes a network controller and a network driver interface layer that is likely to be found on most existing networked computers that include a cable modem. Therefore, less specialized software and hardware is required to connect a computer to the Internet through a coaxial cable. Cable modem interface unit 90 can be implemented in software and executed by CPU 12, or can be implemented in hardware.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, the present invention is disclosed in connection with a coaxial cable Internet service provider. However, the present invention can be used with any packet source that provides control packets and receives both data and reply control packets.

What is claimed is:

1. A method of operating a cable modem interface unit for transmitting packets to a packet source that requires a reply control packet in response to sending a control packet, wherein the cable modem interface unit is coupled to a cable modem and a network driver interface layer, said method comprising the steps of:

(a) generating a first reply control packet in response to receipt of a control packet;
    (b) queuing the first reply control packet in a transmit stack that includes a first data packet received from the network driver interface layer; and
    (c) sending the first reply control packet and the first data packet to said cable modem;
    (d) receiving an acknowledgment from the cable modem;
    (e) determining whether the acknowledgment is in response to the cable modem receiving a data packet; and
    (f) sending the acknowledgment to the network driver interface layer if at step (e) it is determined that the acknowledgment is in response to the cable modem receiving a data packet.

2. The method of claim 1, further comprising the steps of:
    (g) storing a copy of the first reply control packet;
    (h) receiving an acknowledgment from the cable modem;
    (i) determining whether the acknowledgment is in response to the cable modem receiving the first reply control packet; and
    (j) deleting the copy of the first reply control packet if at step (i) it is determined that the acknowledgment is in response to the cable modem receiving the first reply control packet.

3. The method of claim 1, wherein the cable modem comprises a network controller, and the network driver interface layer complies with the Network Driver Interface Specification (NDIS).

4. The method of claim 3, wherein the network controller is an Ethernet controller.

5. A cable modem interface unit positioned between a cable modem and a network driver interface layer for transmitting packets to a packet source that requires a reply control packet in response to sending a control packet, said interface unit comprising:

(a) a protocol handler coupled to the cable modem and having a control packet input and a reply control packet output, said protocol handler generating a reply control packet in response to receiving a control packet on said control packet input; and
    (b) a transmit unit coupled to said protocol handler comprising:
        a reply control packet input coupled to said reply control packet output of said protocol handler;
        a packet output coupled to the cable modem;
        a stack for queuing received packets;
        a data packet input coupled to the network driver interface layer;
        a modem acknowledgment input coupled to the cable modem;
        an acknowledgment output coupled to said protocol handler;
        a first acknowledgment input coupled to said acknowledgment output of said transmit unit; and
        a data acknowledgment output coupled to the network driver interface layer.

6. The cable modem interface unit of claim 5, wherein said transmit unit sends packets queued on said stack to the cable modem on said packet output, and in response receives acknowledgments from the cable modem on said modem acknowledgment input.

7. The cable modem interface unit of claim 5, wherein said protocol handler sends any acknowledgments received in response to the cable modem receiving a data packet to the network driver interface layer on said data acknowledgment output.

8. The cable modem interface unit of claim 5, wherein the cable modem comprises a network controller, and the network driver interface layer complies with the Network Driver Interface Specification (NDIS).

9. The cable modem interface unit of claim 8, wherein the network controller is an Ethernet controller.

10. A computer system for receiving packets from a packet source, said computer system comprising:
 (a) a processor;
 (b) a cable modem coupled to said processor and adapted to transmit packets to a packet source that requires a reply control packet in response to sending a control packet;
 (c) a memory coupled to said processor;
 (d) a first sequence of instructions stored on said memory which, when executed by said processor, cause said processor to function as a network driver interface layer; and
 (e) a second sequence of instructions stored on said memory which, when executed by said processor, cause said processor to function as a cable modem interface unit, said cable modem interface unit comprising:
  (i) a protocol handler coupled to the cable modem and having a control packet input and a reply control packet output, said protocol handler generating a reply control packet in response to receiving a control packet on said control packet input; and
  (ii) a transmit unit coupled to said protocol handler comprising:
   (A) a reply control packet input coupled to said reply control packet output of said protocol handler;
   (B) a packet output coupled to the cable modem; and
   (C) a stack for queuing received packets.

11. The computer system of claim 10, said transmit unit further comprising a data packet input coupled to the network driver interface layer.

12. The computer system of claim 11, said transmit unit further comprising a modem acknowledgment input coupled to the cable modem and an acknowledgment output coupled to said protocol handler.

13. The computer system of claim 12, wherein said transmit unit sends packets queued on said stack to the cable modem on said packet output, and in response receives acknowledgments from the cable modem on said modem acknowledgment input.

14. The computer system of claim 12, said protocol handler further comprising a first acknowledgment input coupled to said acknowledgment output of said transmit unit and a data acknowledgment output coupled to the network driver interface layer.

15. The computer system of claim 10, wherein said protocol handler sends any acknowledgments received in response to the cable modem receiving a data packet to the network driver interface layer on said data acknowledgment output.

16. A computer-readable medium having stored thereon instructions which, when executed by a processor, cause the processor to perform steps for operating a cable modem interface unit for transmitting packets to a packet source that requires a reply control packet in response to sending a control packet, wherein the cable modem interface unit is coupled to a cable modem and a network driver interface layer, said steps comprising:
 (a) generating a first reply control packet in response to receipt of a control packet;
 (b) queuing the first reply control packet in a transmit stack that includes a first data packet received from the network driver interface layer;
 (c) sending the first reply control packet and the first data packet to said cable modem;
 (d) receiving an acknowledgment from the cable modem;
 (e) determining whether the acknowledgment is in response to the cable modem receiving a data packet; and
 (f) sending the acknowledgment to the network driver interface layer if at step (e) it is determined that the acknowledgment is in response to the cable modem receiving a data packet.

17. The computer-readable medium of claim 16, said steps further comprising:
 (g) storing a copy of the first reply control packet;
 (h) receiving an acknowledgment from the cable modem;
 (i) determining whether the acknowledgment is in response to the cable modem receiving the first reply control packet; and
 (j) deleting the copy of the first reply control packet if at step (i) it is determined that the acknowledgment is in response to the cable modem receiving the first reply control packet.

18. The computer-readable medium of claim 16, wherein the cable modem comprises a network controller, and the network driver interface layer complies with the Network Driver Interface Specification (NDIS).

* * * * *

UNITED STATES PATENT AND TRADEMARK OFFICE
CERTIFICATE OF CORRECTION

PATENT NO. : 5,912,896
DATED : June 15, 1999
INVENTOR(S) : E. BEIGHE et al.

It is certified that error appears in the above-identified patent and that said Letters Patent is hereby corrected as shown below:

Column 1, line 27    "provides" should be --provide--

Signed and Sealed this

Sixteenth Day of May, 2000

Attest:

Q. TODD DICKINSON

Attesting Officer    Director of Patents and Trademarks